March 9, 1926.
G. M. SNODGRASS
AUTOMOBILE SIGNALING DEVICE
Filed Nov. 6, 1923
1,575,652
2 Sheets-Sheet 1
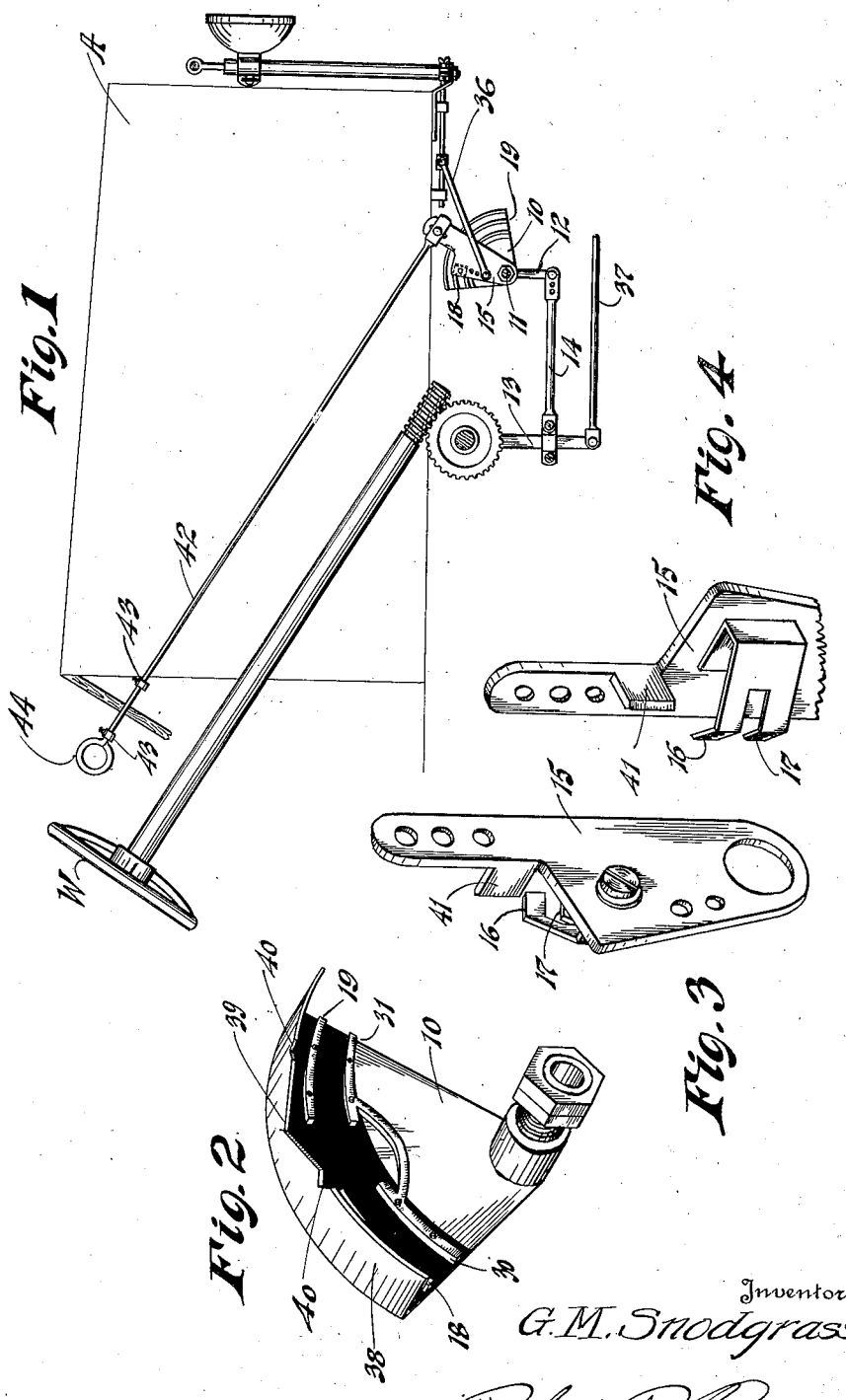

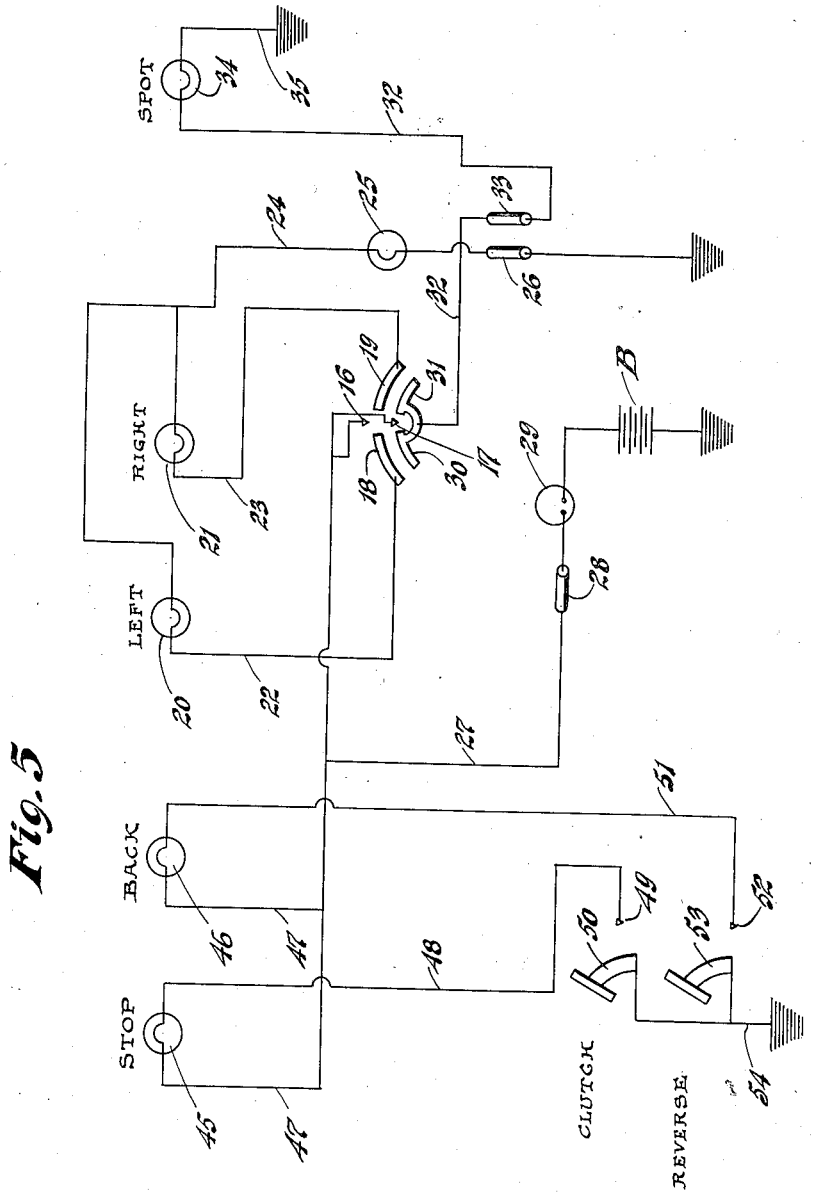

Patented Mar. 9, 1926.

1,575,652

UNITED STATES PATENT OFFICE.

GEORGE M. SNODGRASS, OF SPRINGFIELD, MISSOURI.

AUTOMOBILE SIGNALING DEVICE.

Application filed November 6, 1923. Serial No. 673,144.

*To all whom it may concern:*

Be it known that I, GEORGE M. SNODGRASS, a citizen of the United States, residing at Springfield, in the county of Greene and State of Missouri, have invented certain new and useful Improvements in Automobile Signaling Devices, of which the following is a specification.

This invention relates to automobiles, and has special reference to an automobile signaling device.

Signaling devices have been invented for automobiles which indicate, by the use of appropriate electric lights, the direction in which an automobile is about to turn. Some of these devices operate by manual means, and in such manually operative devices it is commonly necessary that after the turn is made and the necessity for the signal ceases, the operator must manually restore the parts to normal position so that such signal is not shown. In such devices as this it frequently happens that the operator neglects to restore the signal to normal with the result that the machine is driven down the street or road with a signal set indicating a right or left turn, while at the same time the operator has no intention of making such a turn. This of course causes confusion in traffic. Other devices of this character employ means connected with the steering mechanism for closing a circuit through an appropriate light, the signal remaining closed so long as the steering wheel is turned to cause the machine to make a right or left turn. In this type of device it is frequently necessary that a very slight movement of the steering wheel should effect closing of the proper circuit. Consequently, a machine being driven through traffic and equipped with this type of direction indicator is continually indicating a right or left turn, while at the same time the operator has no intention of making such a turn, merely swiveling his machine to pass around or out of the path of another automobile. This action causes confusion in traffic.

The principal and most important objects of the present invention are to provide an improved and novel construction of signaling device wherein the operator, when about to make a turn, manually closes a circuit through a signal lamp or light and wherein, through the operation of the steering gear in straightening out after the turn is made, the circuit is open automatically, thus restoring the signal to its normal position.

A second important object of the invention is the provision of a swiveling spot light, the direction of the beam from the spot light being regulated by the movement of the steering wheel, and the spot light being controlled in a manner similar to the other signal lights, that is to say, having its circuit manually closed and automatically opened by the action of the steering gear in moving from the position to effect a turn to the position to drive straight.

With the above and other objects in view as will be hereinafter apparent, the invention consists in general of certain novel details of construction and combinations of parts hereinafter more fully described, illustrated in the accompanying drawings and specifically claimed.

In the accompanying drawings like characters of reference indicate like parts in the several views, and:

Fig. 1 is a side elevation in outline of a portion of an automobile disclosing the improved mechanism, controlling signals and spot light.

Fig. 2 is a perspective view of a certain segment used in connection with the circuit closing and breaking device in this invention.

Fig. 3 is a similar perspective view of a certain closing arm used herewith.

Fig. 4 is a perspective view of said contact arm locking from the opposite side.

Fig. 5 is a wiring diagram disclosing the wiring of the different circuits.

In the present disclosure, the front portion of an automobile is indicated at A, and it will be seen that at the front of the automobile there is provided a segment 10 which is mounted preferably within the hood and is carried on a segment shaft 11 having depending rocking arm 12 fixed thereon and connected to the steering arm 13 by a link 14. The steering arm is operated in the usual manner from the steering wheel W. It will now be seen that as the steering wheel is turned in one direction the segment will oscillate in that direction, while opposite movement of the steering wheel will similarly effect opposite movement of the segment. Journalled on the shaft 11 is a contact arm 15, and on this contact arm is a contact spring having respective contact fingers 16 and 17. The contact fingers 16 normally lie between a pair of contact segments 18 and 19 which are connected respectively to the signal lamps 20 and 21 by wires 22 and 23. Furthermore, these lamps are connected in multiple to a ground wire 24 passing through a pilot light 25 and provided with an operator's switch 26. The contacts 16 and 17 are connected in multiple by a wire 27 through a switch 28 and ammeter 29 to the automobile battery B. Similarly, the contact 17 traverses a pair of spaced segmental contacts 30 and 31 which are connected in multiple by a wire 32 through an operator's switch 33 to a spot light 34, the light being grounded as at 35. This spot light 34 is swivelly mounted in front of the hood of the machine and is connected by a linkage 36 with the steering rod 37 which runs from the steering arm to the steering connection of the front wheels. Carried by the segment 10 at its arcuate periphery is a notched bar 38 having a deep centrally disposed notch 39 at each side of which is a shallow notch 40. On the contact arm 15 is a pawl lug 41 engageable in said notches, the contact arm being preferably yieldable to permit the pawl to slip from one notch to the other under certain conditions of operation which will be explained. At 42 is a control rod which has one end pivotally connected to the contact arm and passes at its other end slidably through one or more fixed parts of the automobile, as for instance, the dash and the instrument board. On this control rod are collars 43 which are so spaced as to permit the contact arm to be oscillated between definite limits, the collars acting as stops by their engagement with the fixed part or parts of the automobile. The control rod is provided with an operator's handle 44.

This device may be used in connection with the stop and back lights often used in signaling systems, and in order to provide for such use, there is preferably employed a stop indicating lamp 45 and a back indicating lamp 46, these lamps being connected in multiple to the wire 27 by wires 47. From the stop light a wire 48 leads to a contact 49 in the path of the usual clutch lever 50. Similarly from the backing light a wire 51 leads to a contact 52 in the path of the reverse lever 53. These levers are grounded through the usual connections indicated at 54. In order to understand the operation of the device, let it be supposed that the operator proposes to turn to the right. He pushes in on the control rod until the contact arm reaches the forward limit of its movement. This causes the contact to be established between the contact 16 and segment 19 and the contact 17 and segment 31. Under these conditions it will be obvious that current will flow through the right turn lamp 21 and the spot light will be lit. At this time the upper collar 43 engages the fixed part of the automobile so that the contact arm can move no further forwardly. In its forward movement, the pawl lug 41 has ridden out of the central notch 39 in which it is normally located and into the forward shallow notch 40, this notch merely serving to prevent accidental movement of the control rod and contact arm after the circuit just established is opened. Upon reaching the point at which the right turn is to be made, the operator moves his steering wheel in the usual manner. Now the contact arm cannot move further in the forwardly direction. Consequently, the pawl lug 41 rides out of the shallow notch in which it was engaged, and into the central notch. The front wheels are turned and the segment moves forwardly so that the contact segments 19 and 31 move from under the contacts 16 and 17 which thus assume their normal position with respect to contact segments of the device, and break the circuits through the lamps 21 and 34. After the turn has been completed and the operator straightens out by restoring the steering wheel to its normal straight ahead position, the segment swings back to its connection with the steering mechanism and carries with it the contact arm so that the control rod again assumes its normal position and is ready for further operation of the device.

It will be obvious that a left hand turn is accomplished in a manner identically similar, the control rod being pulled instead of pushed.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is wished to include all such as properly come within the scope claimed.

Having thus described the invention, what is claimed as new, is:

1. In a direction indicator for automobiles having a battery and a steering mechanism, a pair of direction indicating lamps, a swivelling spot lamp, a circuit for each of said lamps including said battery, manually controlled means for simultaneously shifting the position of the spot light and closing the battery circuit thereof, said means also serving to close a circuit through a respective direction indicating lamp, and means controlled by the steering mechanism including a portion of said first mentioned means to open both lamp circuits upon turning movement of the steering mechanism.

2. In a direction indicator for automobiles having a battery and a steering mechanism, a pair of direction indicating lamps, a swivelling spot lamp, a circuit for each of said lamps including said battery, manually controlled means for simultaneously shifting the position of the spot light and closing the battery circuit thereof, said means also serving to close a circuit through a respective direction indicating lamp, and means controlled by the steering mechanism including a portion of said first mentioned means to open both lamp circuits upon turning movement of the steering mechanism, said last mentioned means including means engaging said manual means when in open circuit position to restore the several parts to original position upon movement of the steering mechanism from turning to straight forward position.

In testimony whereof I affix my signature.

GEORGE M. SNODGRASS.